S. MYERSON.
RIVETING TOOL.
APPLICATION FILED AUG. 23, 1919.
1,357,247.
Patented Nov. 2, 1920.
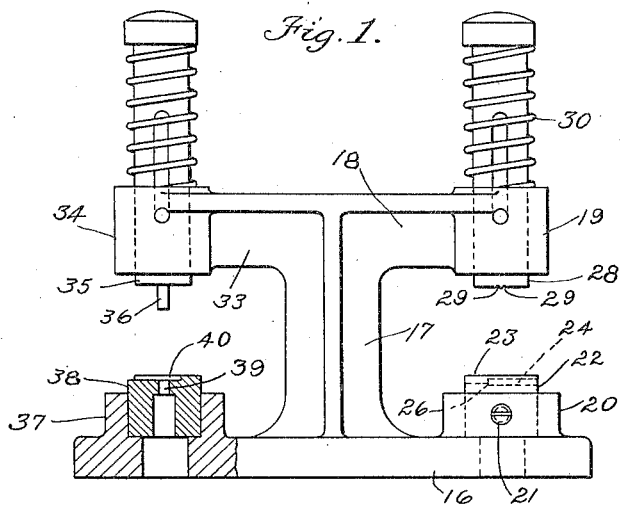
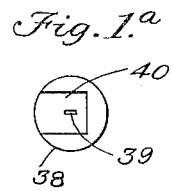
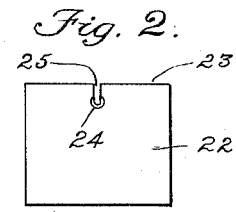
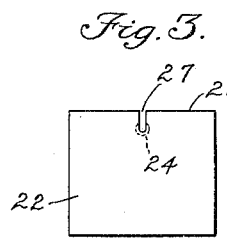
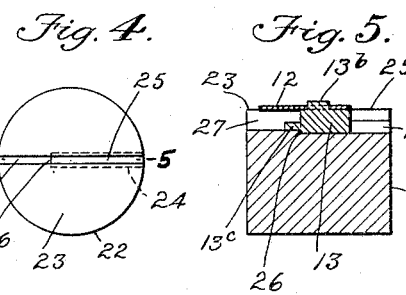
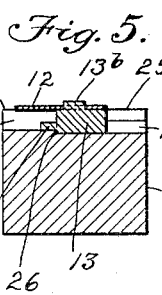
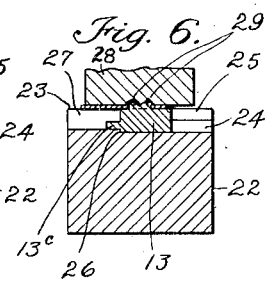
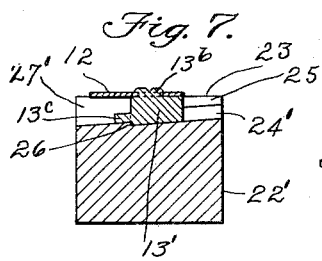
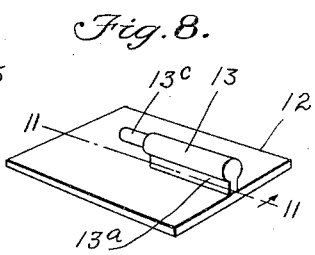
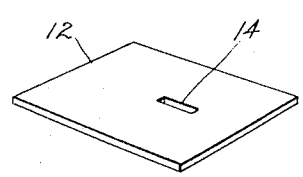
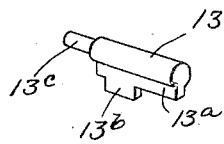
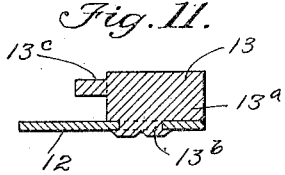
Inventor
Simon Myerson
by
Attorneys

UNITED STATES PATENT OFFICE.

SIMON MYERSON, OF CAMBRIDGE, MASSACHUSETTS, ASSIGNOR TO AMERICAN GUARANTEED TOOTH COMPANY, INC., OF BOSTON, MASSACHUSETTS.

RIVETING-TOOL.

1,357,247.  Specification of Letters Patent.  Patented Nov. 2, 1920.

Application filed August 23, 1919. Serial No. 319,448.

*To all whom it may concern:*

Be it known that I, SIMON MYERSON, a citizen of the United States, residing at Cambridge, in the county of Middlesex and State of Massachusetts, have invented new and useful Improvements in Riveting-Tools, of which the following is a specification.

This invention has for its object to provide a tool whereby a dentist may conveniently secure to a backing plate of an artificial tooth a tenon to engage a socket in a porcelain tooth body. The tool is intended for use in connection with a tooth backing which includes a backing plate for the tooth body, the plate being provided with a slot and a tenon, composed of an enlarged portion adapted to closely fit a socket in the tooth body, a neck portion, the thickness of which is less than the diameter of the enlarged portion, and a rivet portion formed on one edge of the neck portion, said rivet portion being adapted to enter a slot in the backing plate and to be upset to firmly secure the tenon to the backing plate.

The invention is embodied in the improved means hereinafter described and claimed, for holding the tenon and backing plate in a predetermined position when they are assembled, and upset the rivet while the parts are held in said position, the said means constituting elements of a tool adapted to be conveniently operated by a dentist. The tool also preferably includes means for punching the backing plate to form the rivet-receiving slot therein.

Of the accompanying drawings forming a part of this specification,—

Figure 1 is a side elevation of a tool embodying the invention, parts of the tool being shown in section.

Fig. 1ᵃ is a top plan view of the holder, shown in section by Fig. 1.

Fig. 2 is a side elevation of the holder which supports the tenon and backing plate during the upsetting operation.

Fig. 3 is a view similar to Fig. 2, showing the opposite side of the holder.

Fig. 4 is a top plan view of the holder shown by Figs. 2 and 3.

Fig. 5 is a section on line 5—5 of Fig. 4, and a sectional view of the tenon and backing plate supported by the holder.

Fig. 6 is a view, similar to Fig. 5, illustrating the operation of upsetting the rivet.

Fig. 7 is a view similar to Fig. 6, showing a modification.

Fig. 8 is a perspective view of a completed backing.

Fig. 9 is a perspective view of the backing plate.

Fig. 10 is a perspective view of the tenon.

Fig. 11 is a section on the plane indicated by line 11—11 of Fig. 8.

The same reference characters indicate the same parts in all of the figures.

The tooth backing shown by Fig. 8 is of well known form, and includes a backing plate 12 formed to bear on one side of a porcelain tooth body and a tenon 13 projecting from the inner side of the plate 12, and adapted to enter a socket in a tooth body, the tenon being of the general form shown by Fig. 10, and including a neck portion 13ᵃ, a rivet portion 13ᵇ, and a reduced longitudinal portion or pin 13ᶜ. The backing plate 12 is provided with a slot 14 adapted to receive the rivet. When the rivet is inserted in the slot, and upset, as indicated by Fig. 11, the tenon is firmly secured to the backing plate.

The tool embodying my invention is adapted to support the plate and the tenon while the rivet is being upset. Said tool includes a supporting frame which as here shown, comprises a base 16, a standard 17, and an arm 18 overhanging the base and having a guide 19.

The base 16 is provided with a socket 20, in which is secured as by a set screw 21, a holder 22, which is preferably a cylindrical block fitting the socket 20. The holder is provided with a top face 23, formed to support the plate 12, and with a socket formed to receive the tenon, and locate the rivet on said tenon in a predetermined position above said face and above the plate 12. Said socket includes an enlarged longitudinal portion 24, formed to receive the tenon body 13, a reduced lateral portion 25, opening on the face 23, and formed to receive the tenon neck 13ᵃ, a stop shoulder 26 at one end of the enlarged portion, and formed to abut against one end of the tenon as shown by Fig. 6, and a reduced longitudinal portion 27 formed to receive the pin 13ᶜ on the tenon body.

The form and arrangement of the socket are such that the operator is enabled to insert the tenon in the socket and locate the rivet 13ᵇ by moving the tenon into contact with the stop 26. The rivet is thus caused to project above the slot-supporting face, so that the operator may now deposit the plate 12 on said face, the slot 14 of the plate receiving a rivet.

28 is a plunger movable in the guide 19, and is provided with a swaging face which is formed to upset the rivet and indent a part thereof, as shown by Fig. 11, said face being preferably formed by parallel grooves 29 in the end face of the plunger. The sides of these grooves form inclined faces adapted to elongate and upset the rivet, as best shown by Fig. 6. The plunger 28 is normally raised by a spring 30, as indicated by Fig. 1, and is adapted to be depressed by the blow of a hammer or mallet delivered on its upper end to cause the upsetting face of the plunger to act on the rivet, as indicated by Fig. 6, a single blow being sufficient.

To enable the tool to perform, in addition to the operation above described, the operation of forming the slot 14 in the plate 12, I provide the standard 17 with an additional arm 33, having a guide 34 for the plunger 35, carrying a punch 36, adapted to form the slot 14. The base 16 is provided with a socket 37, containing a holder 38, adapted to support a plate 12 in position to be slotted by the punch 36, the holder being provided with an opening 39 coinciding with the punch and with a recess 40, adapted to position the plate 12 with reference to the opening 39 and the punch 36. A multiple tool is thus provided comprising a base, a standard perpendicular to the base and centrally located thereon, so that the base has end portions projecting from opposite sides of the standard, oppositely projecting plunger guides on the standard overhanging the end portions of the base, plungers movable in said guides, and fixed holders on the end portions of the base adapted to support stock in the path of the plungers. The term "stock" includes a plate 12 supported by itself on one holder, and said plate and a rivet-carrying tenon 13 associated therewith on the other holder, the plungers being provided with means for operating on said stock.

The socket portions 24′ and 27′ may be inclined relatively to the face 23, as shown by Fig. 7, to receive a tenon 13′ and pin 13ᶜ which are inclined relatively to the plate 12.

I claim:

1. For use in uniting a rivet-carrying tenon to a slotted plate, a riveting tool comprising a supporting frame having a base, and a plunger guide overhanging the base, a plunger movable in said guide and provided with a swaging face, and a holder fixed to the base and provided with a top face adapted to support said plate, and with a socket adapted to support said tenon with its rivet projecting above said top face and the plate thereon, and in the path of said plunger, the swaging face of the plunger being formed to upset said rivet on said plate.

2. A riveting tool substantially as specified by claim 1, said socket including an enlarged longitudinal portion formed to receive a tenon body, a lateral portion opening on the plate-supporting face, and formed to receive a tenon neck, a stop shoulder at one end of the enlarged portion, and a longitudinal portion formed to receive a pin on the tenon body.

In testimony whereof I have affixed my signature.

SIMON MYERSON.